United States Patent [19]
Wilson et al.

[11] Patent Number: 6,001,076
[45] Date of Patent: Dec. 14, 1999

[54] APPARATUS FOR POSITIONING A PATIENT FOR SPINAL SURGERY

[75] Inventors: Brian Thomas Wilson, Northumbria; Daniel Martin, Newcastle Upon Tyne, both of United Kingdom

[73] Assignees: Nuffield Nursing Homes Trust, Surrey; University of Northumbria at Newcastle, Northumbria, both of United Kingdom

[21] Appl. No.: 08/973,901

[22] PCT Filed: Jun. 18, 1996

[86] PCT No.: PCT/GB96/01489

§ 371 Date: Apr. 17, 1998

§ 102(e) Date: Apr. 17, 1998

[87] PCT Pub. No.: WO97/00659

PCT Pub. Date: Jan. 9, 1997

[30] Foreign Application Priority Data

Jun. 20, 1995 [GB] United Kingdom .................. 9512486

[51] Int. Cl.[6] ......................................................... A61F 5/00
[52] U.S. Cl. ....................................... 602/39; 5/630; 5/612
[58] Field of Search ................................. 602/39, 33, 35; 606/237–245; 5/630, 612, 632, 633, 634, 640, 611, 84.1, 83.1, 81.1 R; 128/845

[56] References Cited

U.S. PATENT DOCUMENTS

| 2,152,734 | 4/1939 | Ford | 5/632 |
| 2,475,003 | 7/1949 | Black | 606/242 |
| 2,764,150 | 9/1956 | Ettinger et al. | |
| 3,643,938 | 2/1972 | Levasseur | 606/241 |
| 4,584,731 | 4/1986 | Carter | 5/431 |
| 4,860,733 | 8/1989 | Parker, Jr. | 606/237 |
| 5,661,860 | 9/1997 | Heitz | 5/632 |

FOREIGN PATENT DOCUMENTS

| 8904650 | 6/1989 | European Pat. Off. |
| 1262695 | 4/1961 | France |
| 2578417 | 9/1986 | France |

*Primary Examiner*—Richard J. Apley
*Assistant Examiner*—Justine R. Yu
*Attorney, Agent, or Firm*—Sughrue, Mion, Zinn, Macpeak & Seas, PLLC

[57] ABSTRACT

A device for positioning a patient for surgery. The device is used with an operating table, and includes two arms for resting on the operating table, a patient support, and a lifting mechanism arranged to move the patient support between a first position in which the patient support lies level with the operating table, and a second position above the table. The patient is rolled onto the support in the first position, and is then raised to the second position.

18 Claims, 7 Drawing Sheets

APPARATUS FOR POSITIONING A PATIENT FOR SPINAL SURGERY

TECHNICAL FIELD

When carrying out surgical operations on a patient, the patient is conventionally supported on an operating table or bed throughout the course of the operation. A standard operating table comprises at least two panels forming the table top, these panels being supported by a central pillar fixed to the floor. The panels are hinged to each other, allowing the table to break to form an inverted 'V'-shaped orientation. The panels are also pivotable with respect to the central pillar, allowing the table to be inclined, and may be raised or lowered as required by a surgeon operating on the patient. It is common for operating tables to include two end panels for support of the patient's head and feet. These end panels are pivotal with respect to the adjacent panels, and allow greater control of the patient's posture and positioning during surgery. The correct posture and positioning of the patient assists in the ease of access by the surgeon. Further, incorrect posture of the patient during operations, especially operations lasting many hours, may result in unnecessary trauma to the patient including bruising of soft tissue which increases their recovery time.

For some operations, the mere breaking of the table by pivoting the panels forming the table is unable to achieve the required posture and positioning for an operation. Examples of this include operations performed on the spine of a patient, in which the desired posture is with the lumbar region of the spine straight, or often positively curved, that is convex. This separates the vertebrae of the spine, improving access by the surgeon, compared to the spacing when this region of the spine adopts the normal concave shape. Conventional operating tables cannot be positioned to achieve this required posture. Other examples of operations in which the positioning of the patient is of especial importance and which cannot be achieved by a conventional operating table alone includes surgery where access is required from the rear side of the patient, for example to the back of the legs.

PRIOR ART

The most common solution to achieve the posture required by the surgeon is to provide a raised platform on the operating table, which raises particular parts of the patient's body. Whilst these devices achieve an improved posture of the patient, it is difficult to get an unconscious patient onto the operating table and into the correct position where a raised support is provided on the table. Generally, a patient is brought to the operating theatre, anaesthetized, lying on their back on a trolley, and must be slid or rolled onto the operating table. Where a raised platform is provided on the operating table, the patient must be lifted off the trolley, and lifted over the platform. For spinal surgery, the patient must also be rotated in the air. This procedure requires a large number of theatre staff, all of whom must bear the weight of the patient. Many injuries are caused to the theatre staff in lifting and handling the patient. This is due not merely to the lifting of the patient, but also to the incorrect posture that the theatre staff must adopt during operating table and trolley and lift the patient with outstretched arms.

One example of a raised platform used in spinal operations is the Wilson frame. The Wilson frame comprises two arched stands, the end of each stand including a foot which allows the stands to be rested on opposite sides of the top of the operating table. The arched stands are bridged by support platforms which support a pad on which the patient is positioned. By pulling the ends of each stand towards each other, the arch increases in height. The ends may be pulled together by use of a screw between the two ends. This device does not give the optimum posture desired by surgeons. Furthermore, even in the lowest position, the top of the stand is 25 to 30 cm above the top of the operating table, and therefore, as indicated above, requires difficult patient lifting and handling. Despite these disadvantages of the Wilson frame, it has been used for many years, and has recently been remarketed.

SUMMARY OF THE INVENTION

According to the present invention, a portable patient positioning device for use with an operating table, comprises two arms for resting on the operating table, a patient support, and a lifting mechanism arranged to move the patient support and a patient supported by the patient support between a first position in which the patient support lies between the arms substantially level with the arms on the operating table, and a second position above the arms, to support a patient in a predetermined position clear of the operating table, the device further comprising a frame connected to teh arms which is arranged to hang below the operating table when the arms of the device rest on the operating table.

With this arrangement, the patient support initially lies substantially flat on the operating table, allowing a patient to be easily slid or rolled from a trolley onto the operating table. This does not require lifting of the patient, and therefore only minimal weight needs to be borne by theatre staff during the transfer of the patient from a trolley to the operating table. When the patient has been transferred to the operating table, the lifting mechanism raises the patient support, and therefore a part of the patient's body supported by the support, so that the desired posture and positioning of the patient is achieved for the operation to be carried out, with minimum risk of injury to the patient or theatre staff. Accordingly, the patient positioning device permits the optimum positioning and posture of a patient to make the operation as simple as possible, and with least risk of injury to either the patient or to the theatre staff manoeuvring the patient.

The frame may include the lifting mechanism this ensures that the device does not extend significantly above the height of the table, and also prevents the lateral movement of the device with respect to the operating table. The arms preferably extend across the entire width of the operating table.

The device advantageously includes castors which allow the device to be manoeuvred easily around the operating theatre as required without requiring any lifting. Where the device includes castors, it is desirable to include a means to prevent the device from moving when positioned on the operating table. This is preferably achieved by a retraction mechanism to allow the castors to be lifted clear of the floor. This is advantageous as it also moves the castors out of the way of theatre staff who may otherwise trip on the castors, and prevents cables for other equipment used in the operating theatre from becoming tangled on the castors. Further, when the castors are retracted, the device is supported solely by the operating table, and accordingly moves in unison with the operating table. Where the castors are arranged to be lifted clear of the floor, it is preferred that a locking means is provided to ensure that the castors are not accidentally moved. This locking means may be in the form of a sprung pin, this being simple to operate.

The lifting mechanism may be either a manual or powered mechanism. In the case of a manual mechanism, the lift mechanism may comprise a lead screw and handle which may be turned by hand to raise the platform. A powered mechanism may be in the form of hydraulic or pneumatic cylinders, although it is preferred that the lifting mechanism includes a linear actuator with a motor and lead screw assembly. This is advantageous as, in the event of a power failure, the lifting mechanism does not drop, where as with hydraulic or pneumatic cylinders, a loss of power may result in the lifting mechanism lowering. A linear actuator with a lead screw also requires less power than hydraulic or pneumatic cylinders, as power is only required when the lifting mechanism is being raised or lowered. In addition to the lifting mechanism, it is advantageous to include a linear bearing which is able to resist transverse forces. This is beneficial as hydraulic and pneumatic cylinders and linear actuators are only able to withstand an axial force. The inclusion of a linear bearing to resist transverse forces ensures that the patient support lifted by the lifting mechanism remains stable. This in turn is important as this ensures that a patient supported by the device remains stable and does not move during the operation.

Rather than lifting the platform using a linear lift mechanism, the platform may be pivoted around one of the arms, thereby raising the platform. This is advantageous as the movement of the platform lifts the hips of a patient supported by the platform causing the legs of the patient to slide under the patient's body, thereby opening the vertebrae of the patient. The rotation of the platform can be achieved by a worm and rack gear arrangement.

Where the device is to be used to support a patient undergoing spinal surgery, it is preferred that the patient support is contoured to give a positive curve in the spine of the patient to allow optimum access by the surgeon. This is particularly for neurosurgery and microsurgery, although the flexion is also suited to conventional orthopaedic surgery. It is therefore preferred that the patient support is curved, and in particular that the curve has a radius of about 150 mm, and the ends of the curve subtend an angle of about 150°. The curved patient support supports the iliac crests of the patient during the operation. Additionally, it is advantageous for the patient support to include a substantially planar portion projecting from one end of the curved portion for support of the patient's rib cage. The planar portion may project at an obtuse angle to the end of the curved portion of the patient support. When laying flat on the operating table, the planar portion extends over an arm of the device.

To enable the patient support to lay flat on the operating table, the curved part of the patient support may be formed in a plurality of sections which are hinged to each other, so that the sections may pivot to give the required degree of curvature. Preferably, the planar portion is hinged to one end of the curved part. This allows the patient support both to lie flat, and to occupy the minimum space for storage.

The patient support is preferably formed with an open space between the two opposed sides across the width of the support. This is advantageous as it allows the patient's abdomen to fall in the open space, and therefore allows monitoring of the patient's breathing, and prevents the viscera from pressing against the spine, which otherwise accelerates blood loss. Further, the open space allows monitoring equipment to be used during the operation, for example x-ray and ultrasonic monitoring. For any surgery where access is required to the rear side of the patient, it is important that the patient's soft flesh, and particularly the abdomen, is able to drop freely. Accordingly, where there is an open space in the support corresponding to the abdomenal area of the patient, the support is especially suited to any operations of this type.

It is preferred that the patient support has two pieces, each of which is associated with a separate lifting mechanism. This provides the required open space. Where two lifting mechanisms are provided, these each have the same length of stroke, so that at their maximum and minimum positions they are both at the same height. Normally, the lifting mechanisms will be operated to their maximum or minimum position to ensure they are level. However they may be positioned at any intermediate position as required. Advantageously, the sides of the patient support decline towards the open space. This ensures that the patient is well supported, centred, and assists in the prevention of movement of the patient during the operation. This is important as the surgeon requires the patient to maintain a constant position throughout the operation.

DETAILED DESCRIPTION OF PREFERRED EMBODIMENT

Figure 1:
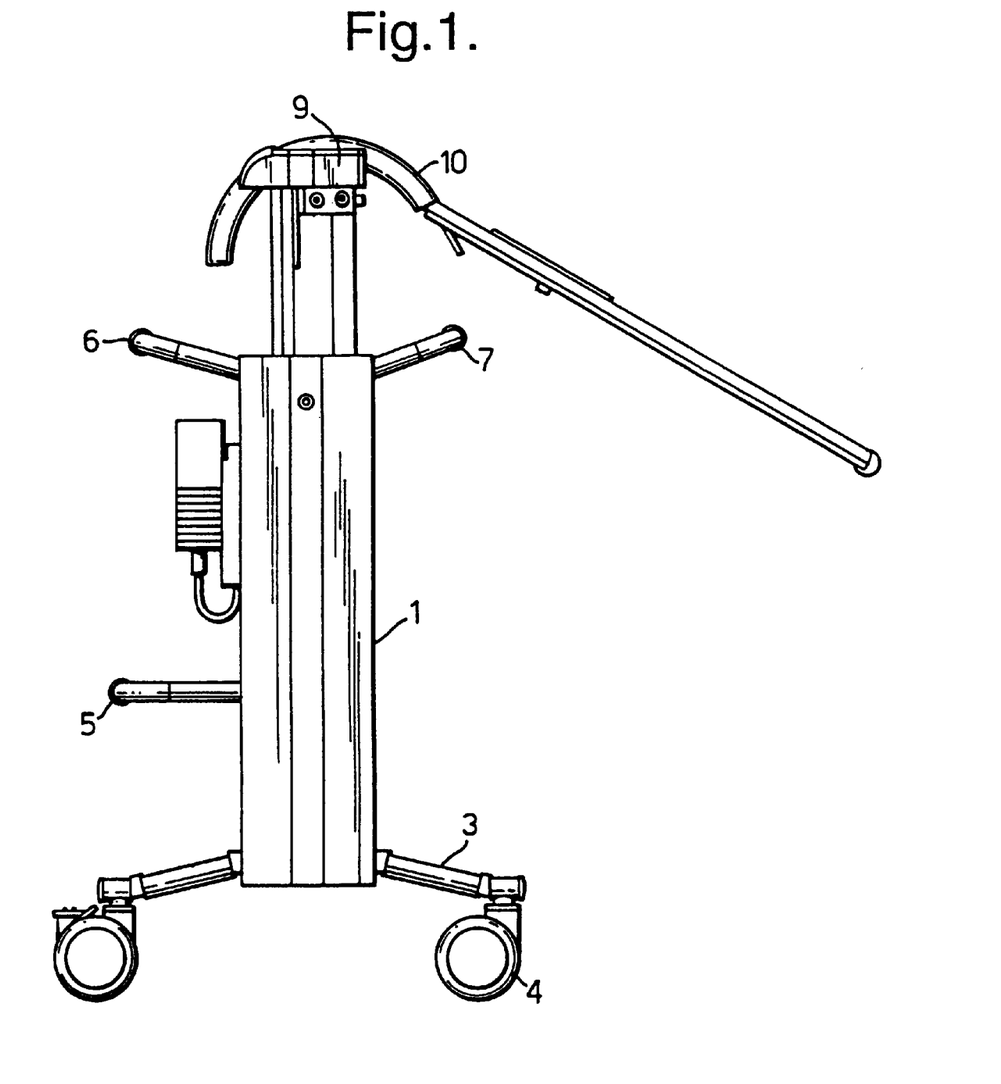
FIG. 1 shows a side view of the device in a raised position.
Figure 2:
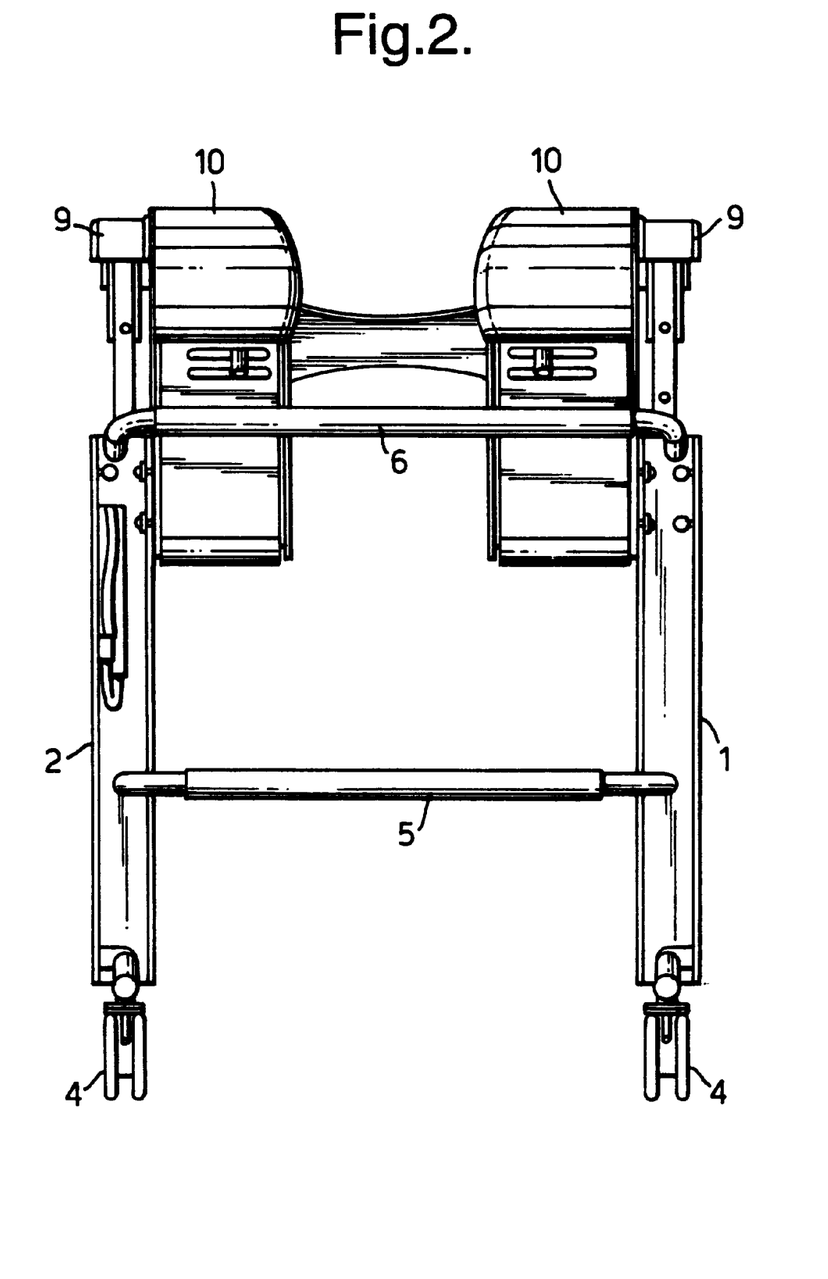
FIG. 2 shows an end view of the device in a raised position.
Figure 3:
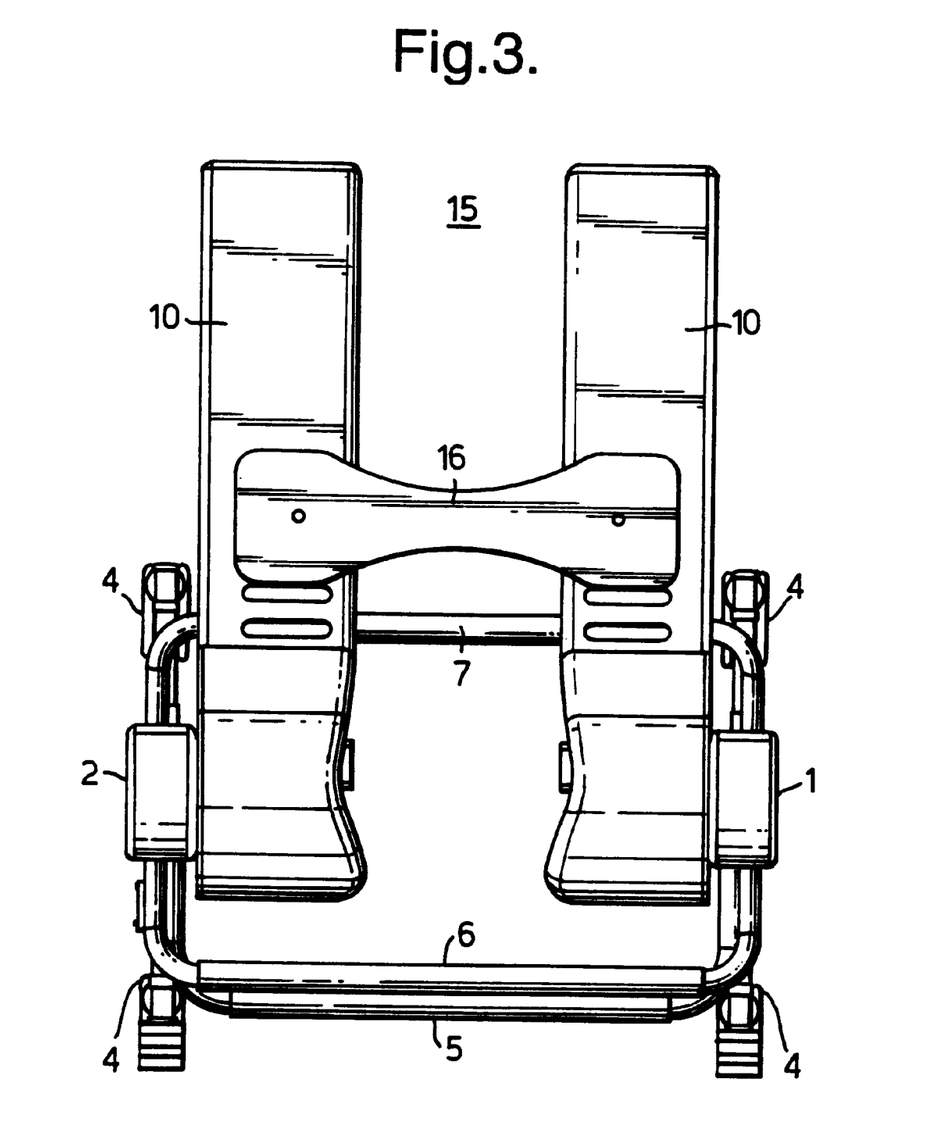
FIG. 3 shows a plan view of the device in a raised position.
Figure 4:
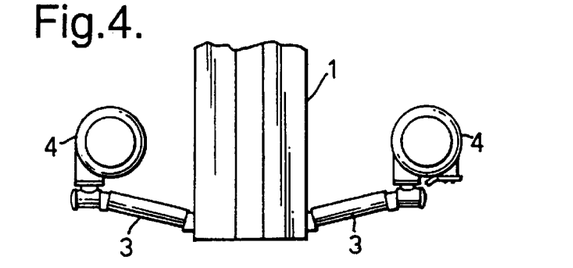
FIG. 4 shows a view of the castors when raised.

As shown in FIGS. 1 to 3, the device comprises a trolley including a frame having two uprights 1, 2 which extend generally vertically when the trolley is upright. Each of the uprights includes a leg 3 extending generally horizontally through the upright 1, 2, and includes a castor 4 at each end. This allows the trolley to be wheeled about without requiring lifting of the device. The legs 3 are pivotally mounted to the uprights. In this way, rotation of the legs 3 cause the castors 4 to be lifted clear of the ground.

The two uprights 1, 2 are connected by transverse connecting arms. One connecting arm 5 is provided near the bottom of the uprights 1, 2. The arm 5 is in a plane offset from the vertical plane containing the uprights 1, 2. This offset allows the device to be mounted on an operating table, as described below, without the connecting arm 5 obstructing the positioning of the device adjacent the central pillar of the table.

A further pair of connecting arms 6, 7 are provided towards the top of the uprights 1, 2. These arms 6, 7 form horizontally extending parallel bars on opposite sides of the vertical plane containing the uprights 1, 2. From the side, the two arms 6, 7 and the uprights 1, 2 form a Y-shaped configuration. The parallel bars of the connecting arms 6, 7 are covered in a non-slip material, for example rubber. The arms 6, 7 are secured rigidly to the uprights 1, 2, and as described below, are also used for mounting the device onto an operating table.

Figure 10:
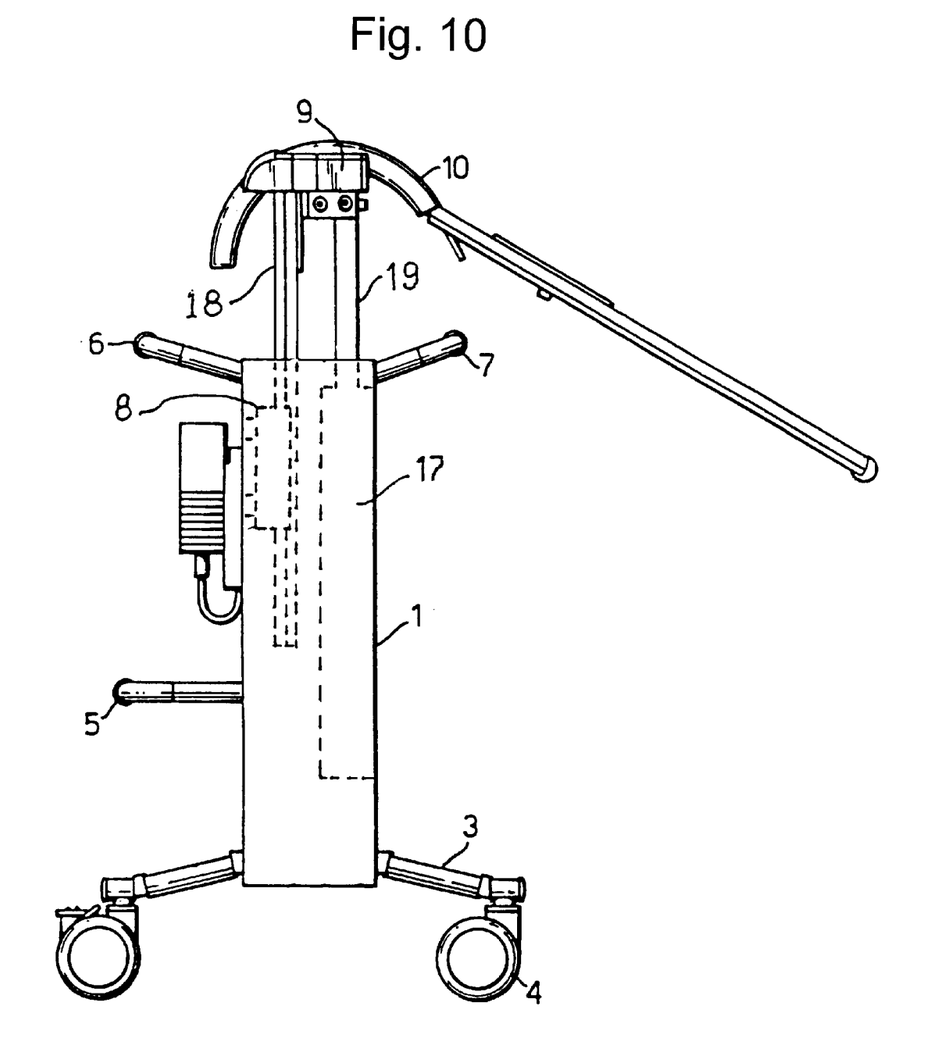
FIG. 10 is another side view of the device in a raised position.

Each upright includes a lifting mechanism for lifting a patient support. The lift is achieved by a linear actuator, for example a P60-024 type actuator available from Electro Mechanical Services Limited of Aldermaston, UK. The actuators include a small DC motor which rotates a lead screw to achieve lift or drop. If there is any loss of power, the motor will stop but there will be no lift or drop as the lead screw will retain its position. FIG. 10 shows the linear actuator and lead screw apparatus, with lifting mechanism 17, rail 18, and piston 19.

The actuators are powered by re-chargeable batteries. This means that there is no requirement for mains leads to be trailed to the platform during operation. Such leads would get in the way of the surgeon and other theatre staff during surgery. Further, alternating currents may affect sensitive monitoring equipment in the operating theatre. By using re-chargeable batteries, there is no need to provide power leads to the device during the operation, and the direct current is less likely to effect sensitive equipment.

To minimise space, the batteries are provided only in one of the uprights 1, 2, and are connected to the actuator in the other upright 1, 2 by wires. These wires pass through the hollow lower connecting arm 5.

Figure 5:
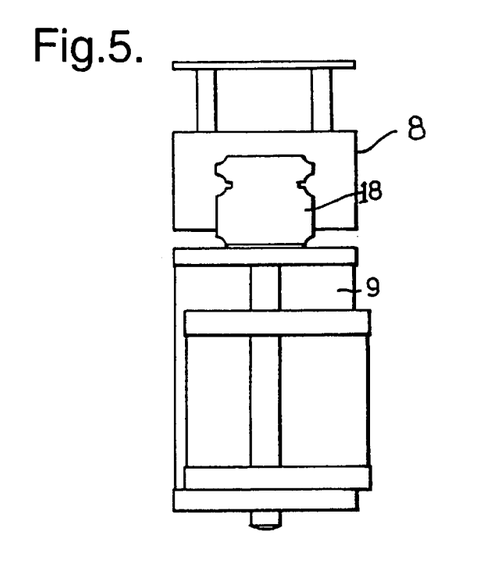
FIG. 5 shows a plan view of the linear bearing of the lifting mechanism.

The actuators are able to withstand a high axial load of at least 1200 kg, however are unable to withstand a high transverse load. Accordingly, a linear bearing 8, for example a High Load Capacity Type LH-Series Linear Guide, available from NSK Limited, is used to withstand transverse loads. The combination of the linear actuator and the linear bearing 8 ensure that the lift mechanism and therefore the supported patient is very stable.

The actuators and linear bearings 8 in each upright 1, 2 are independent of each other, however are controlled to operate in the same manner to ensure that they both raise and fall at approximately the same rate. Both actuators have the same maximum and minimum extension, and therefore any differences in their height during raising or lowering will be removed at the end of their stroke. The actuators may be positioned at an intermediate position if this is required.

Figure 9:
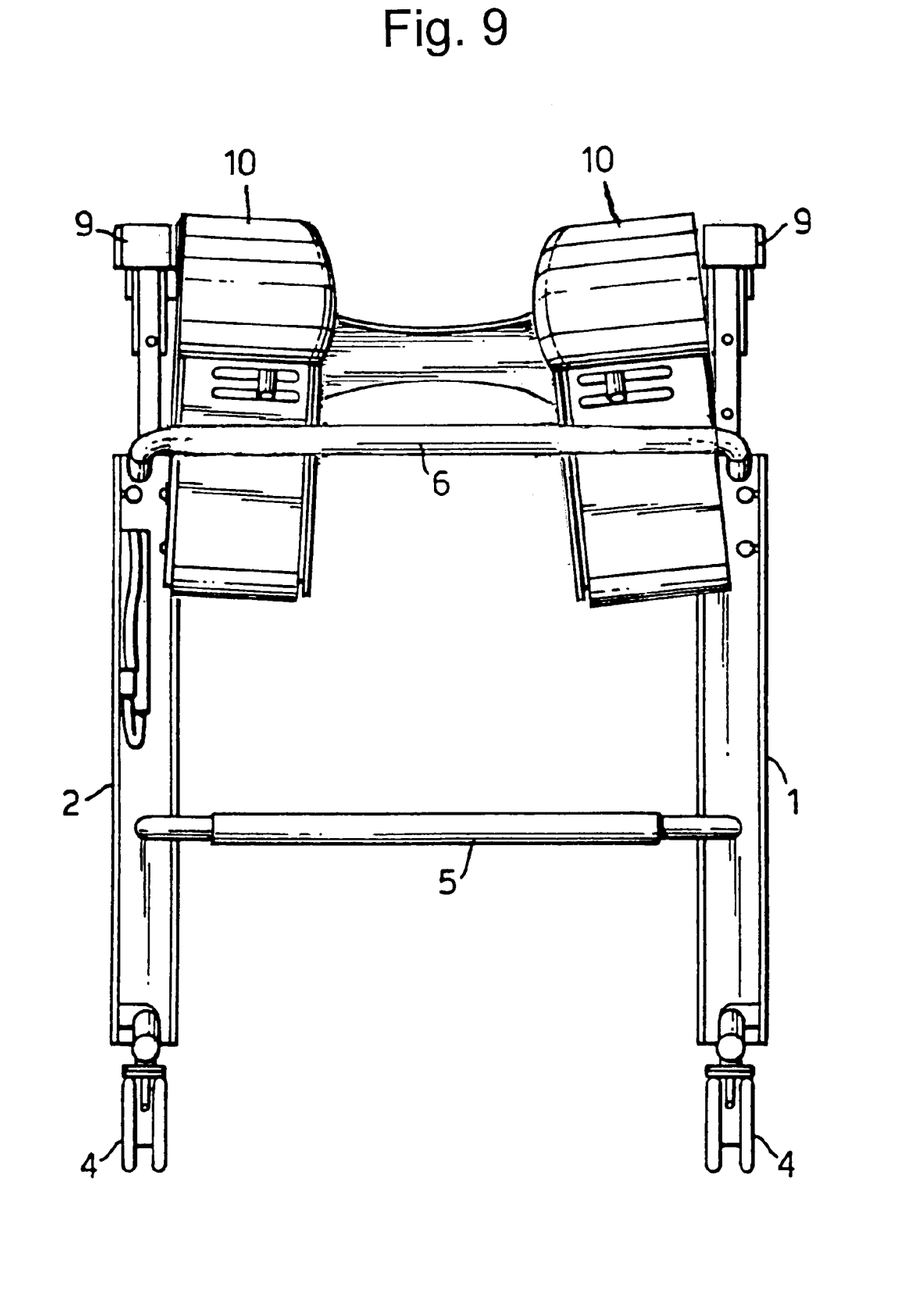
FIG. 9 is another end view of the device in a raised position, similar to FIG. 2.

Each pair of actuator and linear bearing 8 supports a mounting block 9 which is raised and lowered by operation of the actuator. The mounting blocks support the patient support 10, which can thereby be raised or lowered as required. The patient support 10 is pivotally mounted onto the mounting blocks 9 to allow the support 10 to decline between the uprights 1, 2 and toward the open space between the portions of the supports 10, as shown in FIG. 9. This dipping holds the patient securely and centrally during surgery.

The actuators and linear bearings 8 may be replaced by a manual lifting mechanism to reduce the cost of the device. This manual lifting mechanism may merely consist of a handle which can manually be turned to replace the motor.

Figure 6:
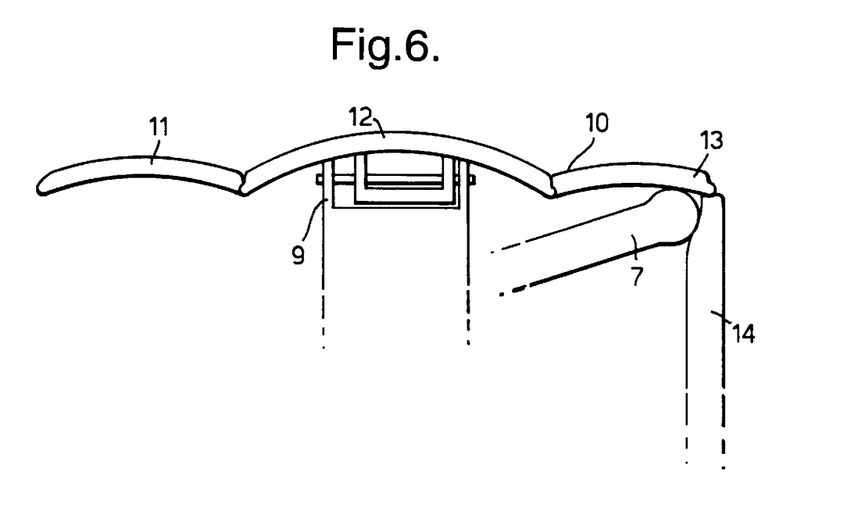
FIG. 6 shows a side view of a patient support when laying flat.
Figure 7:
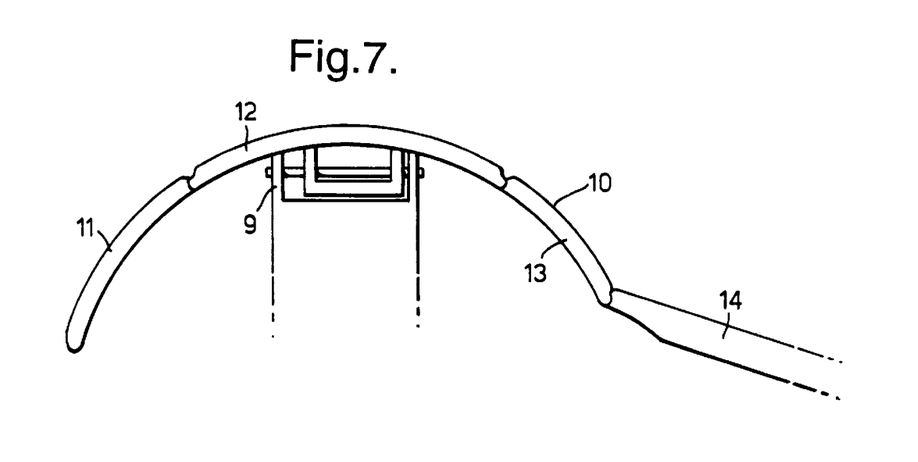
FIG. 7 shows a side view of a patient support when in a supporting position.
Figure 8:
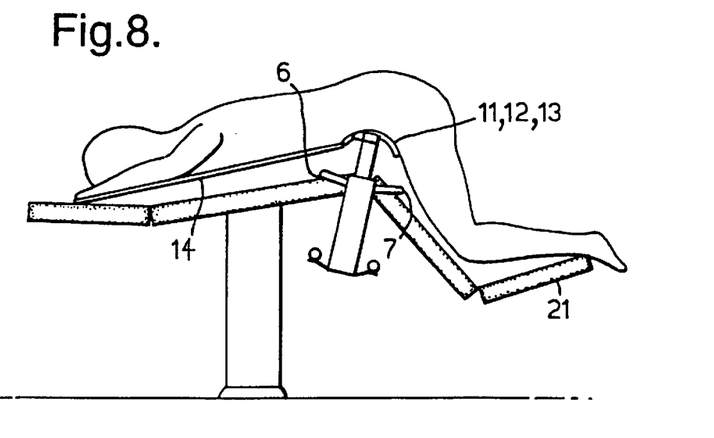
FIG. 8 shows a side view of the device in conjunction with an operating table supporting a patient.

For an operation on the spine of a patient, the patient support 10 comprises four hinged sections 11, 12, 13, 14. Three of these sections 11, 12, 13 are convexly curved sections. The hinges allow these sections to form a continual curve as shown in FIG. 7 which, in use, supports the iliac crests, or hips, of the patient. It has been found that the ideal profile of this curve is a curve having a radius of about 150 mm, and the two ends of the curve subtending an angle of about 150°. The fourth section 14 is an elongate flat section which in use supports the rib cage of the patient as shown in FIG. 8. In use, this section 14 lies at an obtuse angle to the curved supporting section 11, 12, 13. As each section 11, 12, 13, 14 of the platform 10 is hinged to the adjacent section, when the actuator is lowered, the four sections 11, 12, 13, 14 form a substantially planar surface as shown in FIG. 6 which rests on the top of an operating table, but form the optimum shaped support for the patient when the support is raised throughout the duration of the operation. A chest plate 16 is provided between the two sides of the platform 10 giving support across the space 15 between these parts. When laying flat on the table, the curved sections 11, 12, 13 lie between the arms 6, 7 of the device, with the planar section 14 extending over the arms 6, 7. Accordingly, the planar section is thin to minimise the height above the operating table.

The device is designed to be used in conjunction with a conventional operating table. To attach the support to the table, it is wheeled to the operating table, and over the table so that the two upper connecting arms 6, 7 are above the table, and the uprights 1, 2 are below the level of the operating table. The two upper connecting arms 6, 7 are positioned either side of a break in the table. In this position, the four sections 11, 12, 13, 14 of the patient support 10 flex about their inter-connecting hinges to lie generally flat on the top of the table. As described above, the legs 3 of the trolley are rotated so that the wheels 4 are lifted clear of the floor, and the device hangs below the table on the two upper connecting arms 6, 7, as shown in FIG. 8.

The patient is brought alongside the operating table whilst this is in the flat position with the patient support lying flat on the bed of the table. The patient is then rolled from the trolley onto the table. To assist in this movement, a pat slide may be used to bridge the gap between the trolley and the operating table. Although there is still a certain amount of physical effort required to roll the patient onto the operating table, there is no actual lifting of the patient, or positioning of the patient whilst the entire weight of the patient is being borne by the theatre staff. Further, the staff do not need to reach across the operating table to lift the patient. Therefore there is far less danger of injury to the theatre staff than with other systems.

Once the patient is laying face down on the operating table, the table is broken and the two actuators powered, to cause the patient support 10 to lift away from the surface of the table. As the support is moved away from the table, the sections 11, 12, 13, 14 of the support pivot with respect to each other so that the three curved sections 11, 12, 13 adopt the predetermined curve, and the fourth section 14 bears against the surface of the table supporting the weight of the patient at the patient's rib cage. By breaking the operating table between the two upper connecting arms 6, 7, the device is securely mounted on the table, with the weight of the device and the rubber, non-slip coating on the arms, ensuring that it does not slip. In this position, the uprights bisect the two sections of the operating table. As the table is moved, for example pivoted, raised or lowered with respect to the main supporting pillar, the device remains securely in position, allowing the surgeon to move the table as required without moving the patient's posture.

In the final position, the patient's head is below the vertical height of his arms. This is advantageous for the anaesthetist. The patient's ankles are supported by the foot end 21 of the operating table, with the main weight of the patient supported by the rib cage on the fourth part 14 of the patient support 10, and by the iliac crests on the curved part 11, 12, 13 of the support 10. As all of the weight is supported by these hard parts of the body, there is minimal weight supported by the soft tissues of the body, in particular the arms, legs and stomach, and therefore there is minimal bruising caused to the patient. This significantly reduces the trauma to the patient which is important as one of the main problems after an operation is due to the bruising caused to the patient through support for a long period of time on the soft parts of the body. The supports are covered with a gel pad, panels containing a visco-elastic polymer, to further reduce the possibility of bruising to the patient during the operation. Additionally, gel panels prevent slipping of the patient, and are particularly suitable for use in operating theatres as they are easily cleanable and are reuseable, and are transparent to x-rays, therefore allowing monitoring of the patient during the operation. Three separate gel panels are used, one below each of the iliac crests of the patient, and another below the rib cage of the patient. Suitable gel panels are available from Akton Products of Hagerstown, U.S.A. It is desirable that the patient's knees do not contact the operating table in the final position. In this way, the weight of the legs causes the hips to twist over the curved support, and this opens up the lower spine as required for operations.

During spinal operations, it is important that the abdomen of the patient is able to drop freely. This allows the patient to breathe freely, and prevents the viscera from pressing against the spine, which otherwise accelerates blood loss. To achieve this, the support is formed in two parts with a gap 15 between the parts as shown in FIG. 3, the gap 15 extending in the direction of the patient. This is also advantageous as it allows monitoring equipment to be used below the patient, this not being possible where the support extends across the entire breadth of the patient.

It is claimed:

1. A portable patient positioning device adapted for use with an operating table, the device comprising:

two arms adapted for resting on the operating table, a patient support having first and second portions, said patient support being adapted to support a patient, and a first lifting mechanism adapted to move the patient support between a first position in which the first portion of the patient support lies between the arms substantially level with the arms on the operating table, and a second position above the arms, to support the patient in a predetermined position clear of the operating table, the device further comprising a frame above which said patient support is lifted by said lifting mechanism, the frame being connected to the arms and arranged to hang from the arms with the arms of the device adapted to rest on the operating table.

2. A portable patient positioning device according to claim 1, in which the frame includes the lifting mechanism.

3. A portable patient positioning device according to claim 1, further including castors mounted to said frame and adapted to contact a support surface in use to thereby allow the device to be maneuvered easily on said support surface without requiring any lifting.

4. A portable patient positioning device according to claim 3, in which a castor retraction mechanism is provided to allow the castors to be lifted clear of said support surface.

5. A portable patient positioning device according to claim 4, wherein said castors include a locking means to enable locking of said castors thereby ensuring that the castors are not accidentally moved.

6. A portable patient positioning device according to claim 1, in which the lifting mechanism comprises hydraulic or pneumatic cylinders.

7. A portable patient positioning device according to claim 1, in which the lifting mechanism comprises a linear actuator with a motor and lead screw assembly.

8. A portable patient positioning device according to claim 7 and further including a linear bearing which is able to resist transverse forces.

9. A portable patient positioning device according to claim 1, in which the patient support is contoured to give a convex curve in the spine of the patient to allow optimum access by the surgeon.

10. A portable patient positioning device according to claim 9, in which the first portion of the patient support is curved.

11. A portable patient positioning device according to claim 10, in which the first portion of the patient support has a curve with a radius of about 150 mm, and in which said curve has two ends wherein the ends of the curve subtend an angle of about 150°.

12. A portable patient positioning device according to claim 10, in which the curved part of the first portion of the patient support is formed in a plurality of sections which are hinged to each other, so that the sections are pivotable to give the required degree of curvature.

13. A portable patient positioning device according to claim 1 wherein said patient support has two opposed sides separated by an open space.

14. A portable patient positioning device according to claim 13 in which the opposed sides of the patient support decline towards said open space.

15. A portable patient positioning device according to claim 1, further comprising a second lifting mechanism, wherein said first and second lifting mechanisms are extendable to raise said patient support, and wherein the maximum extension of each of said first and second lifting mechanisms is the same.

16. A portable patient positioning device adapted for use with an operating table, the device comprising:

two arms adapted for resting on the operating table, a patient support having first and second portions, said patient support being adapted to support a patient, a lifting mechanism adapted to move the patient support between a first position in which the first portion of the patient support lies between the arms substantially level with the arms on the operating table, and a second position above the arms, to support the patient in a predetermined position clear of the operating table, a frame above which said patient support is lifted by said lifting mechanism, the frame being connected to the arms and arranged to hang from the arms of the device when the arms of the device rest on the operating table, and castors mounted to said frame and adapted to contact a support surface in use to thereby allow the device to be maneuvered easily on said support surface without requiring any lifting.

17. A portable patient positioning device according to claim 16, in which a castor retraction mechanism is provided to allow the castors to be lifted clear of said support surface.

18. A portable patient positioning device according to claim 17, wherein said castors include a locking means to enable locking of said castors thereby ensuring that the castors are not accidentally moved.

* * * * *